(12) United States Patent
Vilasagar et al.

(10) Patent No.: US 9,260,604 B2
(45) Date of Patent: Feb. 16, 2016

(54) POLYCARBONATE COMPOSITIONS COMPRISING ELASTOMER-MODIFIED GRAFT COPOLYMER PREPARED BY EMULSION POLYMERIZATION

(71) Applicant: SABIC Innovative Plastics IP B.V., Bergen op Zoom (NL)

(72) Inventors: Shripathy Vilasagar, Parkersburg, WV (US); Dejin Li, Athens, OH (US); Amit Kulkarni, Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 64 days.

(21) Appl. No.: 13/833,909

(22) Filed: Mar. 15, 2013

(65) Prior Publication Data

US 2014/0275421 A1      Sep. 18, 2014

(51) Int. Cl.
*C08L 69/00* (2006.01)
*C08L 51/04* (2006.01)
*C08L 55/02* (2006.01)

(52) U.S. Cl.
CPC .............. *C08L 69/00* (2013.01); *C08L 51/04* (2013.01); *C08L 55/02* (2013.01)

(58) Field of Classification Search
USPC .......................................................... 525/67
See application file for complete search history.

(56) References Cited

U.S. PATENT DOCUMENTS

| 5,071,946 | A | * | 12/1991 | Schmidt et al. ............... 528/306 |
| 7,393,896 | B2 | | 7/2008 | DeRudder et al. |
| 2004/0102564 | A1 | | 5/2004 | Guntherberg et al. |
| 2008/0097009 | A1 | * | 4/2008 | Isaji et al. ..................... 523/310 |
| 2009/0239991 | A1 | * | 9/2009 | Avtomonov et al. ......... 524/504 |
| 2010/0069543 | A1 | * | 3/2010 | Monden et al. ................ 524/161 |
| 2010/0282690 | A1 | * | 11/2010 | Padmanabhan et al. ...... 210/757 |
| 2013/0253114 | A1 | | 9/2013 | Seidel et al. |
| 2014/0147660 | A1 | * | 5/2014 | Miyahiro et al. ............. 428/327 |

FOREIGN PATENT DOCUMENTS

| EP | 0354330 | A2 | 6/1989 |
| EP | 0668318 | A1 | 2/1995 |
| EP | 0900827 | A2 | 9/1998 |
| EP | 1647558 | A1 | 10/2005 |
| EP | 2465881 | A1 | 12/2011 |
| EP | 2465882 | A1 | 12/2011 |
| WO | WO 2013/008829 | * | 1/2013 |

OTHER PUBLICATIONS

PCT, International Searching Authority, Search Report, PCT/US2014/027082, Date of mailing: Jun. 30, 2014, 5 pages.
PCT, International Searching Authority, Written Opinion, PCT/US2014/027082, Date of mailing: Jun. 30, 2014, 6 pages.
Patent Cooperation Treaty, International Searching Authority, Search Report, PCT/US2014/027090, Date of mailing: Jul. 8, 2014, 5 pages.
Patent Cooperation Treaty, International Searching Authority, Written Opinion, PCT/US2014/027090, Date of mailing: Jul. 8, 2014, 5 pages.

* cited by examiner

*Primary Examiner* — Jeffrey Mullis
(74) *Attorney, Agent, or Firm* — Cantor Colburn LLP

(57) ABSTRACT

A polycarbonate composition comprises an elastomer-modified graft copolymer prepared by an emulsion polymerization process in which an elastomer phase is polymerized or copolymerized in the presence of an electrolyte to obtain latex particles that is then grafted with a monomer mixture comprising a monovinylaromatic monomer.

28 Claims, No Drawings

POLYCARBONATE COMPOSITIONS COMPRISING ELASTOMER-MODIFIED GRAFT COPOLYMER PREPARED BY EMULSION POLYMERIZATION

FIELD OF THE INVENTION

The present invention is directed to a polycarbonate thermoplastic composition having improved resistance to polymer degradation. More specifically the composition comprises a combination of an aromatic polycarbonate resin and an elastomer-modified graft copolymer.

BACKGROUND OF THE INVENTION

Polycarbonate/acrylonitrile-butadiene-styrene (PC/ABS) blends, products commercially available from SABIC Innovative Plastics, are an important class of polymeric materials for reasons of their excellent balance of properties such as low-temperature ductility, heat resistance, and outstanding aesthetics combined with ease of processing.

The polycarbonate portion of such a blend, however, is susceptible to degradation by acids and bases, especially under conditions of high heat and humidity. Degradation can cause undesirable color formation, loss of molecular weight, reduced chemical resistance or inferior mechanical properties, and generation of volatiles that can cause defects in surface appearance, for example, splay in molded parts.

These problems can be exacerbated by the addition of elastomeric impact modifiers that are commonly used to improve the toughness of polycarbonate compositions. In particular, an elastomer-containing impact modifier prepared by emulsion polymerization can decrease the stability of a polycarbonate. Specifically, compounds employed as aids in the emulsion polymerization of the impact modifier, during its preparation, can remain as residues within the impact modifier and can, thereby, promote transesterification or degradation of a polycarbonate. For example, U.S. Pat. No. 7,393,896 discloses that alkali metal salts of fatty acid emulsifiers, used during emulsion polymerization of an impact modifier to stabilize the emulsion, can later catalyze transesterification or degradation of a polycarbonate composition containing that impact modifier. In turn, the residual amount of emulsifiers remaining in the impact modifier can cause adverse effects, including inconsistent thermal stability of the polycarbonate composition. This can lead to problems during the molding of the polycarbonate composition, due to the variability in viscosity resulting from the catalytic transesterification or degradation of the polycarbonate component.

In view of the above, the use of emulsion-prepared elastomer-modified graft copolymers in polycarbonate compositions has been avoided, in some cases, in favor of bulk polymerized elastomer-modified graft copolymers, particularly when a stringent requirement for hydrostability exists such as exists with respect to molded parts used in the automotive industry. Bulk polymerized acrylonitrile-butadiene-styrene ("bulk ABS") is essentially free of any surfactant. Accordingly, when higher hydrostability is desired, bulk ABS has been used in admixture with a small amount of sulfonate-based MBS to improve the impact resistance of a polycarbonate composition, as disclosed in EP 0900827 and U.S. Pat. No. 7,393,896 assigned to Sabic Innovative Plastics.

Because of the relatively lower elastomer content in bulk ABS, however, it usually cannot be used (or used alone) when higher impact resistance is desired, such as could otherwise be obtained by an emulsion-prepared ABS. An emulsion-prepared ABS can have elastomer levels as high as 60 wt. % or more.

As indicated above, replacing alkali metal carboxylate based surfactants, previously used in preparing elastomer-modified graft copolymers, with a sulfonate surfactant can improve the stability of a polycarbonate/ABS blend, as disclosed by U.S. Pat. No. 7,393,896. However, further improvement is still desired to meet stringent demands for stability required for certain molded parts.

In view of the above, an object of the present invention is to provide an impact-modified polycarbonate composition having improved resistance to polymer degradation, even under strenuous conditions. In particular, an improved balance of high impact resistance and excellent hydrostability and thermal stability is desired.

SUMMARY OF THE INVENTION

After exploring different process and material variables, Applicants surprisingly discovered that replacing the electrolyte used during the preparation of an elastomer-modified graft copolymer can significantly improve the hydrostability of a polycarbonate blend that is later modified with the elastomer-modified graft copolymer for the purpose of higher impact resistance. The electrolyte is employed in preparing the elastomer portion of the elastomer-modified graft copolymer, for example, during polymerization of polybutadiene.

In particular, the invention is directed to an impact resistant polycarbonate polymer composition having improved resistance to polymer degradation, comprising an aromatic polycarbonate in admixture with an elastomer-modified graft copolymer that has been prepared by an emulsion polymerization process in the presence of an electrolyte that is a potassium or sodium salt of an anion selected from the group consisting of phosphate, sulfate, carbonate, nitrate anions, or combinations thereof. Examples of such salts can include, for example, disodium phosphate, dipotassium phosphate, monosodium phosphate, monopotassium phosphate, trisodium phosphate, tripotassium phosphate, sodium bicarbonate, potassium bicarbonate, sodium carbonate, potassium carbonate, sodium nitrate, potassium nitrate, sodium sulfate, potassium sulfate, sodium bisulfate, potassium bisulfate, and combinations thereof. Another aspect of the invention is directed to an impact resistant polycarbonate composition having improved resistance to polymer degradation comprising in admixture (a) about 48 to about 75 weight percent of an aromatic polycarbonate and (b) about 52 to about 25 weight percent of an elastomer-modified graft copolymer and optional polymeric flow promoter (based on the total weight of polycarbonate, elastomer-modified graft copolymer, and polymeric flow promoter), wherein the elastomer-modified graft copolymer is prepared by an emulsion polymerization process in which (before grafting) a reaction mixture comprising butadiene is polymerized in the presence of an electrolyte that is a potassium or sodium salt of an anion selected from the group consisting of phosphate, sulfate, carbonate, or nitrate anions, and combinations thereof, further in the presence of a surfactant selected from the group consisting of substituted or unsubstituted alkyl sulfonates, alkylaryl sulfonates, alkyl sulfates, alkylaryl sulfates, alkyl phosphate, alkylaryl phosphates, and mixtures thereof; in which each alkyl group in the surfactant can have 1-20 carbon atoms and each aryl group in the surfactant can have 6-12 carbon atoms, wherein the elastomer-modified graft copolymer is made by a process in which an agglomerated latex of diene polymer is grafted with a monomer mixture comprising a styrenic monomer and an acrylonitrile monomer. Substituted alkylaryl sulfonates include, for example, alkyl diaryloxide disulfonates. Specifically, the electrolyte can be selected from the group consisting of disodium phosphate, dipotassium phosphate, monosodium phosphate, monopotassium phosphate, trisodium phosphate, tripotassium phosphate, sodium bicarbonate, potassium bicarbonate, sodium carbonate, potassium carbonate, sodium nitrate, potassium nitrate, sodium sulfate, potassium sulfate, sodium bisulfate, potassium bisulfate, and combinations therefore. Advantageously, the resulting polycarbonate composition can have a melt flow rate (MFR) that, after aging in an oven for 1000 hours at 90±2° C. and 95±3% RH (relative humidity), does not change by more than 5.0 g/10 minutes units.

Still another aspect of the invention is directed to a method of preparing a polymer composition having improved resistance to polymer degradation comprising carrying out emulsion polymerization of a monomer mixture comprising a diene monomer in the presence of an electrolyte that is a potassium or sodium salt of an anion selected from the group consisting of phosphate, sulfate, carbonate, or nitrate anions, and combinations thereof, thereby producing a latex of the diene polymer; grafting monomers onto the diene polymer of the latex to obtain an elastomer-modified graft copolymer; and admixing an aromatic polycarbonate with the elastomer-modified graft copolymer and an optional polymeric flow promoter.

DETAILED DESCRIPTION OF THE INVENTION

Surprisingly, it has now been discovered that degradation of an impact resistant polycarbonate composition can now be reduced or eliminated by means of employing a specified electrolyte in preparing the impact modifier, specifically when preparing an elastomer-modified graft copolymer impact modifier by an emulsion polymerization process in the presence of the electrolyte. This allows preparation of an elastomeric impact modifier that, even though containing residual amounts of the electrolyte, does not result in significant degradation of polycarbonate when later used to make an impact resistant polycarbonate composition.

Furthermore, since the electrolyte used in the present composition is not prone to degrading polycarbonate, they can be left in the elastomeric impact modifier when blended with polycarbonate. Treatment of the elastomer-modified graft copolymer (which can potentially cause other problems) is not required, nor is extensive washing or other purification steps, to reduce residual levels of the electrolyte in the elastomer-modified graft copolymer before use as an impact modifier in a polycarbonate composition.

Thus, one aspect of this invention relates to an impact modified polycarbonate polymer composition having improved stabilization against degradation or transesterification, resulting in improved thermal stability or hydrostability of the composition during processing or, after molding into an article, during use of the subsequent article made from the composition. In other words, the present invention is directed to improving the stability of an impact modified polycarbonate composition by going backward in the process of making the impact modifier utilized in the polycarbonate composition.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function. "Or" means "and/or." Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

As used herein, the term "hydrocarbyl" or "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

As used herein, the term "oxoacid" is defined to be an acid containing oxygen and at least one hydrogen atom bonded to oxygen and forming an ion by loss of one or more protons and having at least one other (central) element (specifically a phosphorus, nitrogen, sulfur or carbon atom) to which oxygen is bonded.

Specifically, the electrolyte in the present composition and method, is a salt of an oxo acid and comprises one or more potassium or sodium cations counterbalancing an acidic anion in which only oxygen atoms are bonded to a single central phosphorus, nitrogen, or sulfur, or carbon atom. One or two potassium or sodium cations can counterbalance an anion of an oxy acid anion having three or four oxygen atoms in which there is at least one hydrogen bonded to an oxygen (specifically, one or two hydrogen atoms bonded to, respectively, one or two oxygen atoms). The oxoacid forms an anion by loss of one or more protons. In the present case, the electrolyte is defined to exclude peroxy acids and polyacids, i.e., compounds having two or more phosphorus or other central atoms such as tetrasodium pyrophosphate. An effective amount of the electrolyte for forming the emulsion is used during emulsion polymerization. Specifically, more than 50 mole percent, specifically more than 80 mole percent, and more specifically all of any oxoacid salt that is present during emulsion polymerization is the electrolyte defined herein.

As indicated above, the invention is directed to a polycarbonate composition, comprising an impact modifier made using the specified electrolyte during emulsion polymerization. This results in an impact modifier that, when blended with a polycarbonate, provides improved thermal stability resulting from improved resistance to degradation of the polycarbonate component of the composition. The impact modifier is essentially free of any electrolyte that can cause a catalytic effect in promoting the degradation of the polycarbonate component. Such degradation can significantly reduce the molecular weight of the polycarbonate, thereby adversely affecting physical, chemical, and mechanical properties, including melt viscosity and processing performance of the polycarbonate composition.

In contrast to the present composition, prior art emulsion polymerization processes for preparing an elastomer-modified graft copolymer have commonly employed tetrasodium pyrophosphate (TSPP) as an electrolyte. In preparing impact modifiers using such electrolytes, however, it was found that residual amounts of the electrolyte can remain in the impact modifier. The amount of residual electrolyte can depend to some extent on the method of recovering the impact modifier. For example, spray drying of the impact modifier or the use of salt coagulants or acid coagulants, which are employed in obtaining the final impact modifiers, can affect the amount of electrolyte remaining in the final product. In any case, however, the presence of the tetrasodium pyrophosphate was found to adversely affect the stability of a composition based on polycarbonate when modified with the impact modifier in which the electrolyte was associated, as demonstrated by experiments described in detail below.

Polycarbonates useful in preparing polycarbonate compositions are generally aromatic polycarbonates. A "polycarbonate" means compositions having repeating structural carbonate units of formula (1)

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

$$HO-A^1-Y^1-A^2-OH \qquad (2)$$

wherein each of $A^1$ and $A^2$ is a monocyclic divalent aromatic group and $Y^1$ is a single bond or a bridging group having one or more atoms that separate $A^1$ from $A^2$. In one embodiment, one atom separates $A^1$ from $A^2$. Specifically, each $R^1$ can be derived from a dihydroxy aromatic compound of formula (3)

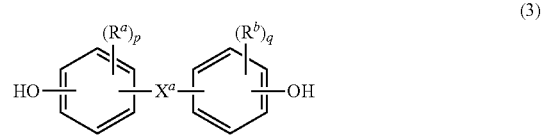

(3)

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In one embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, $X^a$ is a $C_{1-18}$ alkylene group, a $C_{3-18}$ cycloalkylene group, a fused $C_{6-18}$ cycloalkylene group, or a group of the formula $-B^1-G-B^2-$ wherein $B^1$ and $B^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

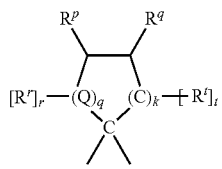

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or $-N(Z)-$ where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols (3) can be used in the manufacture of polycarbonates containing phthalimidine carbonate units of formula (4a)

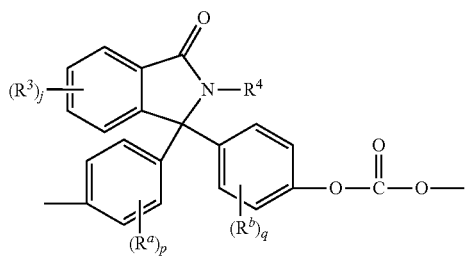

(4a)

wherein $R^a$, $R^b$, p, and q are as in formula (3), $R^3$ is each independently a $C_{1-6}$ alkyl group, j is 0 to 4, and $R_4$ is a $C_{1-6}$ alkyl, phenyl, or phenyl substituted with up to five $C_{1-6}$ alkyl groups. In particular, the phthalimidine carbonate units are of formula (4b)

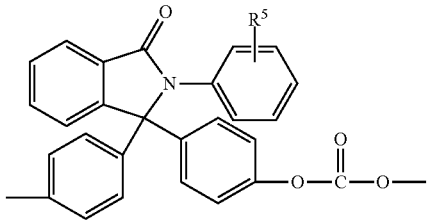

(4b)

wherein $R^5$ is hydrogen or a $C_{1-6}$ alkyl. In an embodiment, $R^5$ is hydrogen. Carbonate units (4a) wherein $R^5$ is hydrogen can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin carbonate units of formula (4c) and (4d)

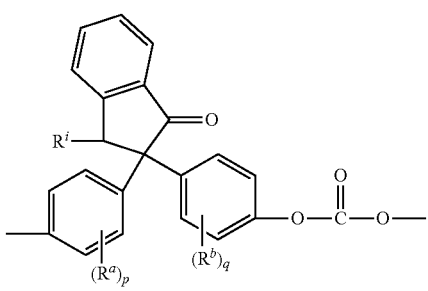

(4c)

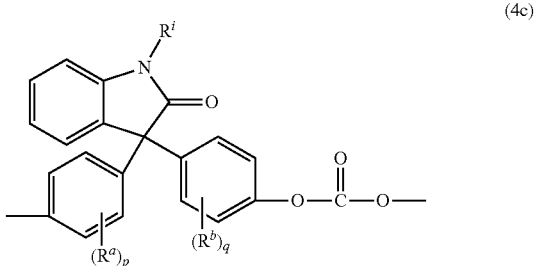

(4d)

wherein $R^a$ and $R^b$ are each independently $C_{1-12}$ alkyl, p and q are each independently 0 to 4, and R' is $C_{1-12}$ alkyl, phenyl, optionally substituted with 1 to 5 to $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and R' is $C_{1-4}$ alkyl or phenyl.

Examples of bisphenol carbonate units derived from bisphenols (3) wherein $X^a$ is a substituted or unsubstituted $C_{3-18}$ cycloalkylidene include the cyclohexylidene-bridged, alkyl-substituted bisphenol of formula (4e)

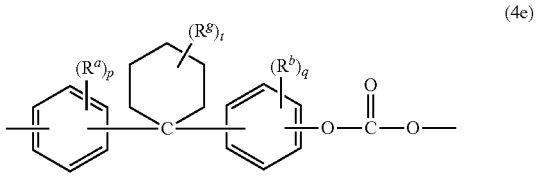

(4e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, r and s are each 0 or 1, and t is 0 or 3, specifically 0.

Examples of other bisphenol carbonate units derived from bisphenol (3) wherein $X^b$ is a substituted or unsubstituted $C_{3-18}$ cycloalkylidene include adamantyl units (4f) and units (4g)

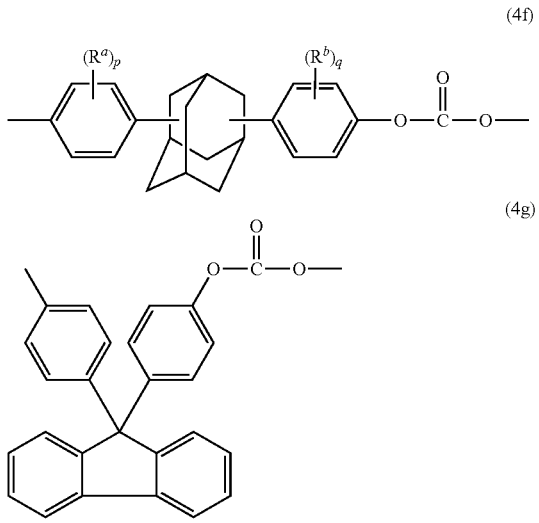

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1. In another specific embodiment, $R^a$, $R^b$ are each methyl, p and q are each 0 or 1. Carbonates containing units (4a) to (4g) are useful for making polycarbonates with high glass transition temperatures ($T_g$) and high heat distortion temperatures.

Other useful aromatic dihydroxy compounds of the formula HO—$R^1$—OH include compounds of formula (6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-2-methylphenyl)propane, 1,1-bis(4-hydroxy-t-butylphenyl) propane, 3,3-bis(4-hydroxyphenyl)phthalimidine, 2-phenyl-3,3-bis(4-hydroxyphenyl) phthalimidine (PPPBP), and 1,1-bis(4-hydroxy-3-methylphenyl) cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (2).

The polycarbonates can have an intrinsic viscosity, as determined in chloroform at 25° C., of 0.3 to 1.5 deciliters per gram (dl/g), specifically 0.45 to 1.0 dl/g. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

In an embodiment, the polycarbonate has flow properties useful for the manufacture of thin articles. Melt flow rate (often abbreviated MFR) measures the rate of extrusion of a thermoplastic through an orifice at a prescribed temperature and load. Combinations of polycarbonates of different flow properties can be used to achieve the overall desired flow property. A high molecular weight aromatic polycarbonate having a relatively high weight average molecular weight can be combined with a relatively low molecular weight aromatic polycarbonate, with a difference of 1,000 to 50,000, specifically 2,000 to 25,000 g/mol. For example, a high molecular weight aromatic polycarbonate having a weight average molecular weight of 27,000 to 100,000 can be combined with a relatively low molecular weight aromatic polycarbonate having a weight average molecular weight of less than 27,000, for example 15,000 to 25,000.

"Polycarbonates" includes homopolycarbonates (wherein each $R^1$ in the polymer of formula (1) is the same), copolymers comprising different $R^1$ moieties in the carbonate ("copolycarbonates"), copolymers comprising carbonate units and other types of polymer units, such as ester units, and combinations comprising at least one of homopolycarbonates and/or copolycarbonates.

Polycarbonates can be manufactured by processes such as interfacial polymerization and melt polymerization. Although the reaction conditions for interfacial polymerization can vary, an process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing esters. In addition, useful transesterification catalysts can include phase transfer catalysts of formula $(R^3)_4Q^+X$, wherein each R³, Q, and X are as defined above. Transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The polycarbonate composition further comprises an elastomer-modified graft copolymer comprising (i) an elastomeric (i.e., rubbery) polymer substrate having a $T_g$ less than or equal to 10° C., more specifically less than or equal to −10° C., or more specifically −40° to −80° C., and (ii) a rigid polymeric superstrate grafted to the elastomeric polymer substrate. As is known, elastomer-modified graft copolymers can be prepared by first providing the elastomeric polymer, then polymerizing the constituent monomer or monomers (comonomers) of the rigid phase in the presence of the elastomer to obtain the graft copolymer. The grafts can be attached as graft branches or as shells to an elastomer core. The grafted monomers or shell can merely physically encapsulate the core, or the shell can be partially or essentially completely grafted to the core, and can partially or essentially completely surround the core or elastomeric substrate.

Materials for use as the elastomer phase include, for example, conjugated diene rubbers; copolymers of a conjugated diene with less than or equal to 50 wt. % of a copolymerizable monomer; elastomeric copolymers of $C_{1-8}$ alkyl (meth)acrylates with butadiene and/or styrene; or combinations comprising at least one of the foregoing elastomers.

A specific elastomer-modified graft copolymer, for use as an impact modifier, is an acrylonitrile-butadiene-styrene (ABS) impact modifier wherein the butadiene substrate is prepared using above-described electrolytes, specifically the above-described electrolytes and emulsifiers in combination. Other examples of elastomer-modified graft copolymers in addition to ABS include but are not limited to acrylonitrile-styrene-butyl acrylate (ASA), methyl (meth)acrylate-butadiene-styrene (MBS), methyl (meth)acrylate-acrylonitrile-butadiene-styrene (MABS), and acrylonitrile-ethylene-propylene-diene-styrene (AES).

Conjugated diene monomers for preparing the elastomer phase of an elastomer-modified graft copolymer include those of formula (7)

(7)

wherein each $X^b$ is independently hydrogen, $C_1$-$C_5$ alkyl, or the like. Examples of conjugated diene monomers that can be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as combinations comprising at least one of the foregoing conjugated diene monomers. Specific conjugated diene homopolymers include polybutadiene and polyisoprene.

Copolymers of a conjugated diene rubber can also be used, for example those produced by aqueous radical emulsion polymerization of a conjugated diene and at least one monomer copolymerizable therewith. Monomers that are useful for copolymerization with the conjugated diene include monovinylaromatic monomers containing condensed aromatic ring structures, such as vinyl naphthalene, vinyl anthracene, and the like, or monomers of formula (8)

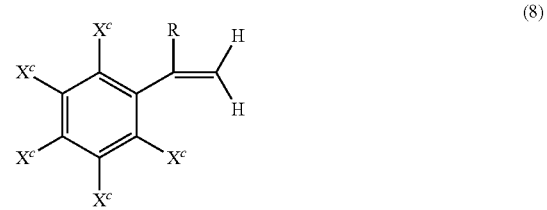

(8)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Monovinylaromatic monomers that can be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene can be used as monomers copolymerizable with the conjugated diene monomer.

Other monomers that can be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (9)

(9)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (8) include acrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl(meth)acrylate, isopropyl(meth)acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Combinations of the foregoing monovinyl monomers and monovinylaromatic monomers can also be used.

(Meth)acrylate monomers for use in the elastomeric phase can be cross-linked, particulate emulsion homopolymers or copolymers of $C_{1-8}$ alkyl(meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl(meth)acrylate monomers can optionally be polymerized in admixture with less than or equal to 15 wt. % of comonomers of formulas (7), (8), or (9), based on the total monomer weight. Comonomers include but are not limited to butadiene, isoprene, styrene, methyl methacrylate, phenyl methacrylate, phenethylmethacrylate, N-cyclohexylacrylamide, vinyl methyl ether or acrylonitrile, and combinations comprising at least one of the foregoing comonomers. Optionally, less than or equal to 5 wt. % of a polyfunctional crosslinking comonomer can be present, based on the total monomer weight. Such polyfunctional crosslinking comonomers can include, for example, divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl(meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase can be polymerized using continuous, semi-batch, or batch processes. A method of preparing a polycarbonate composition having improved resistance to polymer degradation can comprise carrying out emulsion polymerization of a monomer mixture comprising a diene or other unsaturated monomer for making the elastomer phase in the presence of an electrolyte selected from the group consisting of disodium phosphate, dipotassium phosphate, monosodium phosphate, monopotassium phosphate, trisodium phosphate, tripotassium phosphate, sodium bicarbonate, potassium bicarbonate, sodium carbonate, potassium carbonate, sodium nitrate, potassium nitrate, sodium sulfate, potassium sulfate, sodium bisulfate, potassium bisulfate, and combinations thereof, and then grafting monomers onto the latex of the elastomer phase, or diene polymer, to obtain an elastomer-modified graft copolymer. Specifically, the elastomer-modified graft copolymer is prepared essentially in the absence of tetrasodium pyrophosphate.

In addition to employing the specified electrolyte, stability of the polycarbonate composition can be further improved or enhanced by preparing an impact modifier that is essentially free of certain emulsifiers. In particular, the foregoing types of elastomer-modified graft copolymer can be prepared by an emulsion polymerization process that is free of the alkali metal salts of fatty acids, alkali metal carbonates, amines, ammonium salts, and other basic materials. Specifically, the elastomer-modified graft copolymer can be prepared free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials have been commonly used as surfactants in emulsion polymerization, but can catalyze transesterification and/or degradation of polycarbonates. Instead, ionic sulfate, sulfonate or phosphate surfactants can be used in preparing the impact modifiers, particularly the elastomeric substrate portion of the impact modifiers.

Useful surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, or a combination comprising at least one of the foregoing, which compounds can be substituted or unsubstituted with further groups, including additional sulfonate, sulfate, phosphate, or silicate groups. The compounds can comprise alkyl groups having 1 to 20 carbon atoms, specifically 1 to 6 carbon atoms, and aryl groups having 6 to 12 carbon atoms. A specific surfactant is a $C_{6-16}$ alkyl sulfonate, specifically a $C_{8-12}$ alkyl sulfonate. Another specific surfactant is a substituted alkyl aryl sulfonate, specifically a substituted diaryloxide disulfonate, more specifically alkyl diphenyloxide disulfonate, in which a phenyl group is substituted with a phenoxy group substituted with a second sulfonate group and in which the aryl groups are substituted with alkyl groups.

Examples of such surfactants include, but are not limited thereto, sodium dodecyl benzene sulfonate, potassium octyl benzene sulfonate, sodium lauryl sulfate, sodium alkyl naphthyl sulfonates, calcium decyl benzene sulfonate, $C_8$-$C_{16}$ alkylated diphenylether sodium disulfonates, potassium hexyl phosphate, sodium decylphosphate, and mixtures thereof, and the like. An example of a dimethyl substituted diaryloxide disulfonate is commercially available under the trademark DOWFAX 2A1.

Before grafting to form the elastomer-modified graft copolymer, the elastomer portion or substrate, or diene polymer, can be agglomerated to increase the average particle size (for example, to an average particle size of 50 to 1000 nm), wherein monomers are grafted onto the agglomerated diene polymer. The grafting can occur in the presence of an initiator, redox system, and chain transfer agent to obtain the elastomer-modified graft copolymer. Typically the unagglomerated average particle size is about 30 to 150 nm, more specifically about 75 to 100 nm, and the agglomerated average particle size is about 200 to 400 nm, more specifically about 250 to 350 nm.

The particle size of the elastomer substrate is not critical. For example, an average particle size of 0.001 to 25 micrometers (1 to 25000 nanometers), specifically 0.01 to 15 micrometers (10 to 15000 nm), or even more specifically 0.1 to 8 micrometers (100 to 8000 nm) can be used. In one embodiment, the a polybutadiene elastomer substrate can be agglomerated to an average particle size of about 50 to 1000 nm, specifically 100 to 600 nm. Particle size can be measured by simple light transmission methods (Dynamic Light scattering or DLS), which can be estimated also by capillary hydrodynamic chromatography (CHDF). The elastomer phase can be a particulate, moderately cross-linked conjugated butadiene or $C_{4-6}$ alkyl acrylate rubber. In one embodiment, a gel content greater than 70% is used. Specifically, combinations of butadiene with styrene and/or $C_{4-6}$ alkyl acrylate rubbers can be used.

The elastomeric phase can comprise 5 to 95 wt. % of the total graft copolymer, more specifically 20 to 90 wt. %, and even more specifically 40 to 85 wt. % of the elastomer-modified graft copolymer, the remainder being the rigid graft phase. In one embodiment, the weight ratio of the elastomer substrate, or diene polymer, to the superstrate, or graft polymer, is about 4:1 to 1:4, more specifically 2:1 to 1:2.

The rigid phase of the elastomer-modified graft copolymer can be formed by graft polymerization of one or more monomers, including a combination comprising a monovinylaromatic monomer and optionally at least one comonomer in the presence of at least one elastomeric polymer substrate. The above-described monovinylaromatic monomers of formula (8) can be used in the rigid graft phase, including styrene, alpha-methyl styrene, halogenated-styrene such as dibromostyrene, vinyltoluene, vinylxylene, butylstyrene, para-hydroxystyrene, methoxystyrene, or the like, or combinations comprising at least one of the foregoing monovinylaromatic monomers. Useful comonomers include, for example, the above-described monovinylic monomers and/or monomers of the general formula (9). In an embodiment, R in Formula (9) is hydrogen or $C_1$-$C_2$ alkyl, and $X^c$ is cyano or $C_1$-$C_{12}$ alkoxycarbonyl. Specific comonomers for use in the rigid phase include acrylonitrile, methacrylonitrile, methyl (meth) acrylate, ethyl (meth)acrylate, n-propyl(meth)acrylate, isopropyl(meth)acrylate, and the like, and combinations comprising at least one of the foregoing comonomers.

The relative ratio of monovinylaromatic monomer and comonomer in the rigid graft phase can vary widely depending on the type of elastomer substrate, type of monovinylaromatic monomer(s), type of comonomer(s), and the desired properties of the impact modifier. The rigid phase can generally comprise less than or equal to 100 wt. % of monovinyl aromatic monomer, specifically 30 to 100 wt. %, more specifically 50 to 90 wt. % monovinylaromatic monomer, with the balance of the rigid phase being comonomer(s).

In one embodiment, the elastomer-modified graft copolymer is made by a process in which an agglomerated polybutadiene latex is grafted with a monomer mixture comprising styrene and optionally comprising a monomer selected from the group consisting of methacrylate, methyl methacrylate, acrylonitrile, and combinations thereof. In the monomer mixture, styrene and acrylonitrile can be in a ratio of 5:1 to 1:1, specifically, 4:1 to 2:1, more specifically 3.4:1 to 1.5:1 by weight ratio. Thus, for example, the graft superstrate can be derived from 10 to 50%, specifically 15 to 25% by weight of acrylonitrile monomer.

In one embodiment, the graft superstrate formed by the monomer mixture is capable of readily wetting the polycarbonate in the polycarbonate composition, in which the elastomeric substrate comprises repeat units derived from butadiene and the non-elastomeric superstrate is a copolymer comprising repeat units derived from a monovinylaromatic monomer. The elastomer phase, or diene polymer, can comprise 20% to 80% by weight, specifically about 50% by weight of the elastomer-modified graft copolymer.

Following grafting of the elastomer phase, the method for preparing the elastomer-modified graft copolymer, for use in the polycarbonate composition, can further comprise coagulating the elastomer-modified graft copolymer with a salt and then concentrating and drying the coagulated elastomer-modified graft copolymer, as will be readily appreciated by one of ordinary skill.

The elastomer-modified graft copolymer can be admixed with an aromatic polycarbonate optionally further in combination with a polymeric flow promoter. The polymeric flow promoter can readily blend with the elastomer-modified graft copolymer and increase its melt flow rate without adversely affecting the desired properties of the composition.

A polymeric flow promoter can comprise repeat units derived from monomers selected from the group consisting of methyl (meth)acrylate, styrene, acrylonitrile, alpha-methyl styrene and combinations thereof. For example, polymeric flow promoters can include styrene-acrylonitrile copolymers, poly(methyl methacrylate), polystyrene, methyl methacrylate-styrene-acrylonitrile copolymer, poly(alpha methyl styrene), and combinations thereof. Specifically, the polycarbonate composition can comprise a flow promoter that is a styrene-acrylonitrile copolymer.

Depending on the amount of elastomer-modified graft copolymer present, the polymeric flow promoter can form a separate matrix or continuous phase. The polymeric flow promoter can comprise ungrafted rigid polymer or "graft copolymer" that is simultaneously obtained along with the elastomer-modified graft copolymer. Specifically, the polymeric flow promoter can be produced at the same time as the elastomer-modified graft copolymer by using excess monomers from the graft superstrate. Alternatively, the polymeric flow promoter can be prepared or obtained independently and introduced to the elastomer-modified graft copolymer later, for example, during compounding of the elastomer-modified graft copolymer with the aromatic polycarbonate. It can be prepared using emulsion, suspension or bulk/mass polymerization techniques.

In one embodiment, a polymeric flow promoter is obtained during preparation of the elastomer-modified graft copolymer composition, wherein "free" styrene-acrylonitrile copolymer ("free SAN") that is not grafted onto another polymeric chain occurs. Specifically, the free styrene-acrylonitrile copolymer can have a molecular weight of 50,000 to 200,000 Daltons on a polystyrene standard molecular weight scale and can comprise various proportions of styrene to acrylonitrile. For example, free SAN can comprise 75 weight percent styrene and 25 weight percent acrylonitrile based on the total weight of the free SAN copolymer. Free SAN can optionally be present by virtue of the addition of another grafted rubber impact modifier in the composition that contains free SAN, and/or free SAN can by present independent of the preparation of all impact modifiers in the composition.

The impact resistant polycarbonate composition can comprise, in admixture, about 20 to about 90 weight percent of the aromatic polycarbonate and about 80 to about 10 weight percent of the combined elastomer-modified graft copolymer and optional polymeric flow promoter, based on the total weight of polycarbonate, elastomer-modified graft copolymer and optional polymeric flow promoter. Specifically, the polycarbonate composition can comprise, in admixture, about 40 to about 80 weight percent of the aromatic polycarbonate and about 60 to about 20 weight percent of, in combination, elastomer-modified graft copolymer and optional polymeric flow promoter, based on the total weight of polycarbonate, elastomer-modified graft copolymer and optional polymeric flow promoter.

More specifically, the polycarbonate composition can comprise, in admixture, about 48 to about 75 weight percent of the aromatic polycarbonate and about 52 to about 25 weight percent of (in total) elastomer-modified graft copolymer and optional polymeric flow promoter, based on the total weight of polycarbonate, elastomer-modified graft copolymer and optional polymeric flow promoter.

The ratio of elastomer-modified graft copolymer to optional polymeric flow promoter, if present, can be 3:1 to 1:3, specifically 2:1 to 1:2, more specifically 1.5:1 to 1:1.5. Typically, 40 to 95 wt. % elastomer-modified graft copolymer can be combined with 5 to 65 wt. % polymeric flow promoter (for example, graft copolymer), based on the total weight of both. In another embodiment, 50 to 85 wt. %, more specifically 75 to 85 wt. % of the elastomer-modified graft copolymer is combined with 15 to 50 wt. %, more specifically 15 to 25 wt. % polymeric flow promoter such as separate graft copolymer, based on the total weight of both. For example, the polycarbonate composition can comprise styrene-acrylonitrile copolymer (free SAN) present in the amount of 1 to 30 weight percent, based on the total weight of polycarbonate, elastomer-modified graft copolymer, and styrene-acrylonitrile copolymer.

In view of the above, an impact resistant polycarbonate composition having improved resistance to polymer degradation can comprise, in admixture, about 48 to about 75 weight percent of an aromatic polycarbonate and about 52 to about 25 weight percent of a elastomer-modified graft copolymer polymer and optional polymeric flow promoter, based on the total weight of polycarbonate, elastomer-modified graft copolymer, and polymeric flow promoter, wherein the elastomer-modified graft copolymer is prepared by an emulsion polymerization process in which (before grafting) a reaction mixture comprising butadiene or other diene is polymerized in the presence of an electrolyte selected from the group consisting of disodium phosphate, dipotassium phosphate, monosodium phosphate, monopotassium phosphate, trisodium phosphate, tripotassium phosphate, sodium bicarbonate, potassium bicarbonate, sodium carbonate, potassium carbonate, sodium nitrate, potassium nitrate, sodium sulfate, potassium sulfate, sodium bisulfate, potassium bisulfate, and combinations thereof, further in the presence of a surfactant selected from the group consisting of substituted or unsubstituted alkyl sulfonates, alkylaryl sulfonates, alkyl sulfates, alkylaryl sulfates, alkyl phosphate, and alkylaryl phosphates, and mixtures thereof, wherein the alkyl group can have 1-20 carbon atoms and the aryl groups can have 6-12 carbon atoms. The preparation of the elastomer-modified graft copolymer can further comprise agglomerating the polybutadiene latex. A comonomer mixture can then be grafted onto the polybutadiene latex, for example a comonomer mixture comprising styrene and acrylonitrile. In addition to the polycarbonate and elastomer-modified graft copolymer impact modifier, the composition can further include various additives ordinarily incorporated into polymer compositions of this type, with the proviso that the additives are selected so as to not significantly adversely affect the desired properties of the composition. Combinations of additives can be used. The foregoing additives (except any fillers) can be generally present in an amount from 0.005 to 20 wt. %, specifically 0.01 to 10 wt. %, more specifically 0.1 to 5 wt. %, based on the total weight of the composition.

For example, antioxidant additives can include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants can be used in amounts of 0.01 to 0.1 parts by weight, based on 100 parts by weight of the total polymer in the composition.

To prepare the final impact resistant polycarbonate composition for use in products, the components can be mixed by any known methods. Typically, there are two distinct mixing steps: a premixing step and a melt mixing ("melt blending") step. In the premixing step, the dry ingredients are mixed together. The premixing is typically performed using a tumbler mixer or ribbon blender. However, if desired, the premix may be manufactured using a high shear mixer such as a Henschel® mixer or similar high intensity device. The premixing is typically followed by melt mixing in which the premix is melted and mixed again as a melt. Alternatively, the premixing may be omitted, and raw materials may be added directly into the feed section of a melt mixing device, preferably via multiple feeding systems. In melt mixing, the ingredients are typically melt kneaded in a single screw or twin screw extruder, a Banbury mixer, a two roll mill, or similar device. The examples are extruded using a twin screw type extruder, where the mean residence time of the material is from about 20 seconds to about 30 seconds, and where the temperature of the different extruder zones is from about 200° C. to about 290° C.

In a specific embodiment, the components of the impact resistant polycarbonate composition are blended by placing them into an extrusion compounder to produce molding pellets. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In one embodiment, compounding is carried out to ensure that the residence time in the machine is short; the temperature is carefully controlled; the friction heat is utilized; and an intimate blend between the components is obtained.

In particular, the components can be pre-compounded, pelletized, and then molded. For example, after pre-drying the composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 200° C. to 300° C. The pre-compounded composition can be extruded and cut up into molding pieces such as conventional granules, pellets, and the like by standard techniques. The composition can then be molded in any equipment conventionally used for thermoplastic compositions such as, for example, a Newbury or van Dorn type injection molding machine with cylinder temperature of 200° C. to 300° C., specifically 230° C. to 280° C., and mold temperature at 55° C. to 95° C.

The impact resistant polycarbonate compositions of the present invention can advantageously obtain a balance of properties characterized by, after aging in an oven for 1000 hours at 90±2° C. and 95±3% RH (Relative Humidity), the melt flow rate (MFR) of the polycarbonate composition not changing by more than 5.0 g/10 minutes units measured in accordance with ISO 1133 standard at 230° C. using a 3.8 kg load and 300 sec dwell time. Furthermore, the composition can also be characterized by, after aging in an oven for 1000 hours at 90±2° C. and 95±3% RH, the polycarbonate composition exhibiting a change in the melt flow rate (MFR) that is at least 3 g/10 minutes less than, specifically at least 6 g/10 minutes less than, more specifically about 7.5 g/10 minutes less than the change in the same composition when said electrolyte is replaced by an equal amount by weight of tetrasodium pyrophosphate. The melt flow rate (MFR) is measured in accordance with ISO 1133 standard at 230° C. using a 3.8 kg load and 300 sec dwell time.

The Melt flow rate (MFR) of a polymer composition is a measure of the extrusion rate of the polymeric melt through a die with a specified length and diameter under set conditions of temperature and loads, as determined according to ISO 1133, which is hereby incorporated by reference. This melt flow rate technique is based on the principle that flow increases with decreasing polymer viscosity for a given temperature and load test condition. A higher MFR value indicates a lower viscosity under an applied stress (load or weight in kg) and generally increases as the molecular weight of a particular type of polymer decreases. Thus, since decreasing molecular weight is indicative of polymer degradation due to hydrolysis, heat and/or transesterification, an increase in MFR can be viewed as corresponding to a drop in weight average molecular weight ($M_w$) and an increase in polymer degradation.

Melt flow rate methods are described in "Rheology-Principles, Measurements and Applications" by C. W. Macosko (ISBN 0-471-18575-2), "Rheological Techniques" by R. W. Whorlow (ISBN 0-13-775370-5), and "Flow Properties of Polymer Melts" by J. A. Brydson, (ISBN 0-59-205458-6), all three of which are hereby incorporated by reference.

The final polycarbonate composition can be shaped into an article by various techniques known in the art such as injection molding, extrusion, injection blow molding, and gas assist molding. The compositions are thus useful in the manufacture of non-electrical, electrical, or electronic parts. Articles can include the exterior or interior components of aircraft, automotive, truck, motorcycle, or other vehicles (generically "automotive parts"), including panels, quarter panels, rocker panels, trim fenders, deck lids, trunk fairings and lids, hoods, bumpers, fascia, grilles, mirror housings, cladding, wheel covers, hubcaps, door components, spoilers, instrument panels, instrument panel retainers, interior trim, emblem logos, exterior trim, and door handles, tank flaps, rocker panels, side panels, window frames, head or tail lamps, roof racks, and running boards. Articles can also include enclosures for a wide variety of electrical and telecommunication devices, for example, housing for electronic components, including power tools, home appliances, or computer components, computer accessories such as printers, copiers, or keyboards, and telecommunication devices, for example, mobile phones, radios, or fax machines. Still further applications can include, but are not limited to, building and construction applications, display items, signs, and like applications.

This invention is further illustrated by the following Examples, which are not intended to limit the claims.

EXAMPLES

Materials

The following materials used for the examples and comparative Examples are shown in Table 1. In the Tables below, compositions are given by weight based on the total weight of the composition, unless indicated otherwise.

TABLE 1

| Component | Chemical Description [CAS Ref. No.] |
| --- | --- |
| PC1 | Bisphenol A polycarbonate resin, interfacial polymerization, $M_w$ about 30,000 g/mol [CAS: 25971-63-5] from SABIC Innovative Plastics. |
| PC2 | Bisphenol A polycarbonate resin, interfacial polymerization, $M_w$ about 23,000 g/mol [CAS: 25971-63-5] from SABIC Innovative Plastics. |
| ABS | Acrylonitrile-butadiene-styrene graft copolymer, as synthesized. |
| SAN | High flow styrene-acrylonitrile copolymer, 6.2 g/10 min MFR at 190° C./2.16 Kg, 25% AN monomer mole ratio from SABIC Innovative Plastics. |
| SDBS | Sodium dodecybenzenesulfonate (SDBS) surfactant. |
| TSPP | Tetrasodium pyrophosphate ($Na_4P_2O_7$).. |
| MSP | Monosodium phosphate ($NaH_2PO_4$). |
| DSP | Disodium phosphate (DSP, $Na_2HPO_4$). |
| TDMM | t-Dodecylmercaptan (TDDM), chain-transfer agent. |
| $NaHCO_3$ | Sodium Bicarbonate. |
| $K_2S_2O_8$ | Potassium persulfate. |
| CHP | Cumene hydroperoxide initiator. |
| REDOX | Redox system (ferrous sulfate)/(disodium ethylenediamine tetraacetate)/(sodiumformaldehyde sulfoxylate). |

Comparative Examples 1-2 and Examples 3-7

The purpose of the Examples and Comparative Examples is to demonstrate the unique performance of impact-modified polycarbonate according to the present invention with respect to hydrostability, as characterized by a shift in the melt flow rate under conditions of elevated heat and high humidity. A high rubber graft copolymer, specifically an acrylonitrile-butadiene-styrene elastomer-modified graft copolymer, was prepared as follows.

The butadiene elastomer needed for the ABS elastomer-modified graft copolymer was synthesized by a standard batch emulsion process, with monomer to water weight ratio ranged from 0.4 to 1.0, preferably 0.53 to 0.82, using sodium dodecybenzenesulfonate (SDBS) as surfactant, in the amount of 1.0 to 4.0 parts, preferably 2.0 to 3.0 parts by weight, an electrolyte to control latex viscosity, in the amount of 0.1 to 1.0 parts, preferably 0.3 to 0.6 parts by weight, potassium persulfate as initiator, in the amount of 0.05 to 0.30 parts, preferably 0.1 to 0.2 parts by weight, and t-dodecylmercaptan (TDDM) as chain-transfer agent, in the amount of 0.05 to 0.30 parts, preferably 0.1 to 0.2 parts by weight, all based on 100 parts by weight of the total butadiene monomer used in the process. The electrolyte tetrasodium pyrophosphate (TSPP, $Na_4P_2O_7$), commonly used in the industry, in the amount of 0.4 parts by weight, was tested for comparison. Electrolytes tested for potentially improving hydrostability compared to TSPP were disodium phosphate (DSP, $Na_2HPO_4$), monosodium phosphate (MSP, $NaH_2PO_4$), and sodium bicarbonate ($NaHCO_3$), in the amount of 0.4 parts by weight. The resulting polybutadiene latex, which was about 80 nm in average particle size, was pressure agglomerated to about 300 nm average particle size as measured by dynamic laser light scattering (DLLS).

The agglomerated polybutadiene latex was charged at 50 to 60 parts by weight and grafted with 40 to 50 parts by weight of styrene and acrylonitrile monomer (in a 3:1 weight ratio) in a semi-batch process, using cumene hydroperoxide as initiator, ferrous sulfate)/(disodium ethylenediamine tetraacetate)/(sodiumformaldehyde sulfoxylate as a redox system, and TDDM as chain-transfer agent. To the resulting elastomer-modified graft copolymer latex an anti-oxidant emulsion of IRGANOX 1076 phenolic anti-oxidant SDBS was added. The resulting elastomer-modified graft copolymer was then coagulated with calcium chloride. The coagulated elastomer-modified graft copolymer was centrifuged and filtered, and then dried in a fluid bed drier.

The elastomer-modified graft copolymer was compounded with styrene-acrylonitrile copolymer (SAN) and polycarbonate (PC) in a twin-screw extruder (TSE) employing a 30 mm Werner Pfleiderer co-rotating 9-barrel TSE with a vacuum vented mixing screw, at a barrel and die head temperature between 240 and 275° C. and a screw speed of 300 to 500 revolutions per minute (rpm). The extrudate was cooled through a water bath prior to pelletizing. Test parts were injection molded on an Engel® 110T-molding machine with a set temperature of approximately 240 to 265° C.

The formulation used is shown in Table 2 below, in which the polycarbonate (PC) and elastomer-modified graft copolymer levels were maintained the same in all examples.

TABLE 2

| Component | Weight Percent |
| --- | --- |
| PC1 | 47.8 |
| PC2 | 20.0 |
| SAN | 15.8 |
| Elastomer-modified Graft Copolymer | 15.6 |

Standard ISO T-bars (tensile bars) were molded and were aged in an oven for 1000 hours maintained at 90±2° C. and 95±3% relative humidity (RH). The MFR was measured in accordance with ISO 1133 standard at 230° C., 3.8 kg load and 300 s dwell time. The measurement was made on pellets cut from aged and unaged tensile bars (Type A specimen as defined in ISO 3167). The melt flow rate (MFR) of the bars, before and after aging, was measured. A shift in MFR (delta MFR or Δ MFR) of not more than 5.0 g/10 minutes after aging represented the desired hydrostability.

Specifically, the degradation of the material after exposure (aging) to high temperature and high humidity was measured using the Daimler Chrysler Laboratory Procedure LP-463 DB-03-01, in which the molded materials were conditioned in a controlled atmosphere of 23±2° C. and 50±5 relative humidity for not less than 24 hours. The delta MFR (in grams/10 minutes) is the final MFR (aged) minus the initial MFR (unaged).

As mentioned above, a higher MFR value indicates a lower viscosity under an applied stress (load or weight in kg) and generally increases as the molecular weight of a polymer decreases. Thus, since decreasing molecular weight is indicative of polymer degradation due to hydrolysis, heat, and/or transesterification, then an increase in MFR can be viewed as corresponding to a drop in weight average ($M_w$) or number average ($M_n$) molecular weight and an increase in polymer degradation.

The MFR was tested for polycarbonate compositions having various elastomer-modified graft copolymers. The various elastomer-modified graft copolymers were prepared with various electrolytes in the butadiene polymerization, specifically TSPP or different ratios of MSP and DSP.

Details of the different surfactants and electrolytes in each example are shown in Table 3. Comparative Example C-1 (A) is a polycarbonate that comprises an elastomer-modified graft copolymer made with carboxylic acid emulsifier. Comparative Examples C-2, Samples (A) and (B), were made employing the conventionally used electrolyte TSPP in butadiene polymerization. Examples 3 and 4 (Samples A) were made with mixtures of MSP and DSP as the electrolyte in the butadiene polymerization. As described above, the hydrostability aging was performed in an oven for 1000 hours controlled at 90±2° C. and 95±3% RH, as indicated above.

Table 3 provides the results of the first series of experiments, in which the MFR was tested for polycarbonate compositions having various elastomer-modified graft copolymers.

TABLE 3

| Example | Description of elastomer-modified graft copolymer in PC Blend | | Δ MFR |
|---|---|---|---|
| (Sample) | Surfactant | Electrolyte | (g/10 min) |
| C-1 (A) | Carboxylate | TSPP | 41.8 |
| C-2 (A) | SDBS | TSPP | 9.5 |
| C-2 (B) | SDBS | TSPP | 8.5 |
| 3 (A) | SDBS | MSP/DSP 2.0/1.0 weight ratio | 1.1 |
| 4 (A) | SDBS | MSP/DSP 3.9/1.0 weight ratio | 1.0 |

The above results clearly show that replacing the carboxylate surfactant (Comparative Examples C-1) with SDBS (Comparative C-2) significantly improved the hydrostability of the PC/ABS blend, but was not adequate to meet the set goal of an MFR shift of 5.0 g/10 minutes or less after aging for 1000 hours at 90±2° C. and 95±3% RH. That goal was achieved by replacing the commonly used electrolyte TSPP with MSP, DSP, various mixtures of MSP and DSP, or NaHCO₃ (Examples 3-7).

To confirm the results from the first series of experiments, further experiments were carried out, including additional electrolytes. Table 4 shows hydrostability test results for a polycarbonate composition comprising various elastomer-modified graft copolymers made using various electrolytes in butadiene polymerization.

TABLE 4

| Example | Description of elastomer-modified graft copolymer in PC Blend | | Δ MFR |
|---|---|---|---|
| (Sample) | Surfactant | Electrolyte | (g/10 min) |
| C-1 (B) | Carboxylate | TSPP | 33.4 |
| C-2 (B) | SDBS | TSPP | 6.6 |
| 3 (B) | SDBS | MSP/DSP 2.0/1.0 weight ratio | 2.4 |
| 5 (A) | SDBS | MSP/DSP 0.2/1.0 weight ratio | 1.4 |
| 6 (A) | SDBS | DSP | 1.4 |
| 6 (B) | SDBS | DSP | 0.9 |
| 6 (C) | SDBS | DSP | 1.2 |
| C-1 (C) | Carboxylate Surfactant | TSPP | 29.8 |
| 6 (D) | SDBS | DSP | 1.9 |
| 7 (A) | SDBS | NaHCO₃ | 2.2 |

Again, the above results clearly show that replacing the carboxylate surfactant (Comparative Example C-1) with SDBS (Comparative C-2) significantly improved the hydrostability of the PC/ABS blend, but was not adequate to meet the set goal of an MFR shift of 5.0 g/10 min or less after aging for 1000 hours at 90±2° C. and 95±3% RH. However, significantly improved hydrostability was obtained using the electrolytes MSP, DSP, various mixtures of MSP and DSP, or NaHCO₃ (Examples 3-7) in the emulsion process.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An impact resistant polycarbonate composition having improved resistance to polymer degradation comprising an aromatic polycarbonate in admixture with an elastomer-modified graft copolymer that is a product of a process comprising emulsion polymerization in the presence of an electrolyte that is a potassium or sodium salt of an anion selected from the group consisting of phosphate or bicarbonate, and combinations thereof, wherein the elastomer-modified graft copolymer in the impact resistant polycarbonate composition contains residual amounts of the electrolyte;

wherein after aging in an oven for 1000 hours at 90±2° C. and 95±3% RH, the melt flow rate (MFR) of the polycarbonate composition does not change by more than 5.0 g/10 minutes units measured in accordance with ISO 1133 standard at 230° C. using a 3.8 kg load and 300 sec dwell time.

2. The composition of claim 1 wherein the electrolyte is selected from the group consisting of disodium phosphate, dipotassium phosphate, monosodium phosphate, monopotassium phosphate, trisodium phosphate, tripotassium phosphate, sodium bicarbonate, potassium bicarbonate, and combinations thereof.

3. The composition of claim 1, wherein the electrolyte is a potassium or sodium salt of phosphoric acid.

4. The composition of claim 1 wherein after aging in an oven for 1000 hours at 90±2° C. and 95±3% RH, the polycarbonate composition exhibits a change in the melt flow rate (MFR) that is at least 3 g/10 minutes less than the change in the same composition in which said electrolyte is replaced by an equal amount by weight of tetrasodium pyrophosphate, wherein melt flow rate is measured in accordance with ISO 1133 standard at 230° C. using a 3.8 kg load and 300 sec dwell time.

5. The composition of claim 1 wherein the elastomer-modified graft copolymer is a product of a process comprising emulsion polymerization in the absence of tetrasodium pyrophosphate.

6. The composition of claim 1 wherein the elastomer-modified graft copolymer comprises an elastomeric substrate and a non-elastomeric superstrate grafted to the elastomeric substrate.

7. The composition of claim 1 wherein the elastomer-modified graft copolymer comprises, prior to grafting, a diene polymer having a glass transition temperature of 0° C. or less.

8. The composition of claim 6 wherein the elastomeric substrate comprises a diene polymer selected from the group consisting of a polymer that is the reaction product of conjugated dienes, copolymers containing at least about 50 weight % of a conjugated diene, copolymers of alkyl acrylates with styrene, acrylonitrile and/or butadiene, and mixtures thereof.

9. The composition of claim 6, wherein the non-elastomeric superstrate comprises a thermoplastic polymer that is capable of readily wetting the polycarbonate in the composition.

10. The composition of claim 6 wherein the elastomeric substrate comprises repeat units derived from butadiene and the non-elastomeric superstrate is a copolymer comprising repeat units derived from a monovinylaromatic monomer.

11. The composition of claim 6 wherein the elastomer-modified graft copolymer is made by a process in which agglomerated polybutadiene latex is grafted with a monomer mixture comprising styrene and optional monomer selected from the group consisting of methyl acrylate, methyl methacrylate, acrylonitrile, alpha-methyl styrene and combinations thereof.

12. The composition of claim 11 wherein the monomer mixture comprises styrene and acrylonitrile in a ratio of 5:1 to 1:1 by weight.

13. The composition of claim 11 wherein the weight ratio of the polymer to the thermoplastic polymer of the superstrate is about 4:1 to 1:4.

14. The composition of claim 1 comprising, in admixture, about 20 to about 90 weight percent of the aromatic polycarbonate and about 80 to about 10 weight percent of elastomer-modified graft copolymer and optional polymeric flow promoter, based on the total weight of polycarbonate, elastomer-modified graft copolymer, and optional polymeric flow promoter.

15. The composition of claim 1 comprising, in admixture, about 48 to about 75 weight percent of the aromatic polycarbonate and about 52 to about 25 weight percent of elastomer-modified graft copolymer and optional polymeric flow promoter, based on the total weight of polycarbonate, elastomer-modified graft copolymer, and optional polymeric flow promoter.

16. The composition of claim 14 wherein the polymeric flow promoter is a styrene-acrylonitrile copolymer, poly(alkyl (meth)acrylate), polystyrene, alkyl (meth)acrylate-styrene-acrylonitrile copolymer, alpha-methyl styrene-acrylonitrile copolymer or a combination thereof.

17. The composition of claim 16 wherein the polymeric flow promoter is a styrene-acrylonitrile copolymer.

18. The composition of claim 1 wherein the elastomer-modified graft copolymer is a product of a process comprising emulsion polymerization employing a surfactant selected from the group consisting of substituted or unsubstituted alkyl sulfonates, alkylaryl sulfonates, alkyl sulfates, alkylaryl sulfates, alkyl phosphate, alkylaryl phosphates, and mixtures thereof.

19. The composition of claim 18 wherein the surfactant is an alkyl diphenyl oxide disulphonate.

20. The composition of claim 18 wherein the elastomer-modified graft copolymer is a product of a process comprising polymerization in the absence of any emulsifiers that are alkali metal salts of fatty acids, alkali metal carbonates, amines, or ammonium salts.

21. An impact resistant polycarbonate composition having improved resistance to polymer degradation comprising, in admixture, about 48 to about 75 weight percent of an aromatic polycarbonate and about 52 to about 25 weight percent of an elastomer-modified graft copolymer and optional polymeric flow promoter, based on the total weight of polycarbonate, elastomer-modified graft copolymer, and polymeric flow promoter, wherein the elastomer-modified graft copolymer is a product of a process comprising:

Emulsion polymerization in which, before grafting, a reaction mixture comprising butadiene is polymerized in the presence of an electrolyte that is a potassium or sodium salt of an anion selected from the group consisting of phosphate or bicarbonate, and combinations thereof, further in the presence of a surfactant selected from the group consisting of substituted or unsubstituted alkyl sulfonates, alkylaryl sulfonates, alkyl sulfates, alkylaryl sulfates, alkyl phosphate, alkylaryl phosphates, and mixtures thereof, wherein each alkyl group has 1-20 carbon atoms and each aryl group has 6-12 carbon atoms; and agglomeration of the resultant polybutadiene to a polybutadiene latex having a larger particle size;

wherein the elastomer-modified graft copolymer is made by a process in which the agglomerated polybutadiene latex is grafted with a comonomer mixture comprising styrene and acrylonitrile; and wherein the elastomer-modified graft copolymer in the impact resistant polycarbonate composition contains residual amounts of the electrolyte and wherein after aging in an oven for 1000 hours at 90±2° C. and 95±3% RH, the melt flow rate (MFR) of the polycarbonate composition does not change by more than 5.0 g/10 minutes units measured in accordance with ISO 1133 standard at 230° C. using a 3.8 kg load and 300 sec dwell time.

22. A method of preparing a polycarbonate composition having improved resistance to polymer degradation comprising:

emulsion polymerization of a monomer mixture comprising a diene monomer in the presence of an electrolyte that is a potassium or sodium salt of an anion selected from the group consisting of phosphate or bicarbonate, and combinations thereof, thereby producing a latex of a diene polymer;

agglomeration of the latex of the diene polymer to a larger particle size;

grafting monomers onto the agglomerated diene polymer of the latex to obtain an elastomer-modified graft copolymer; and admixing an aromatic polycarbonate with the elastomer-modified graft copolymer and an optional polymer flow promoter; wherein the elastomer-modified graft copolymer in the impact resistant polycarbonate composition contains residual amounts of the electrolyte and wherein after aging in an oven for 1000 hours at 90±2° C. and 95±3% RH, the melt flow rate (MFR) of the polycarbonate composition does not change by more than 5.0 g/10 minutes units measured in accordance with ISO 1133 standard at 230° C. using a 3.8 kg load and 300 sec dwell time.

23. The method of claim 22, wherein emulsion polymerization is carried out in the presence of an electrolyte that is selected from the group consisting of disodium phosphate, dipotassium phosphate, monosodium phosphate, monopotassium phosphate, trisodium phosphate, tripotassium phosphate, sodium bicarbonate, potassium bicarbonate, and combinations thereof, further in the presence of a surfactant selected from the group consisting of substituted or unsubstituted alkyl sulfonates, alkylaryl sulfonates, alkyl sulfates, alkylaryl sulfates, alkyl phosphate, alkylaryl phosphates, and mixtures thereof, wherein each alkyl group has 1-20 carbon atoms and each aryl group has 6-12 carbon atoms.

24. The method of claim 23, further comprising, before grafting, agglomerating the diene polymer to a larger average particle size, coagulating the elastomer-modified graft copolymer, and then concentrating and drying the coagulated elastomer-modified graft copolymer.

25. The method of claim 23 wherein the aromatic polycarbonate is admixed with the elastomer-modified graft copolymer by compounding optionally further with a polymeric flow promoter, wherein the polymeric flow promoter comprises repeat units derived from monomers selected from the group consisting of alkyl (meth)acrylate, styrene, acrylonitrile, alpha-methylstyrene and combinations thereof.

26. An article made from the composition of claim 1.

27. The article of claim 26 wherein the article is a molded automotive part selected from the group consisting of spoilers, instrument panels, instrument panel retainers, interior trim, truck roof fairings, truck hoods, car hoods, bumpers, minor housings, and electroplated wheel covers, hub caps, emblem logos, exterior trim, and door handles.

28. The composition of claim 21, wherein the electrolyte is a potassium or sodium salt of phosphoric acid.

* * * * *